T. R. McKNIGHT.
DUMP CAR.
APPLICATION FILED FEB. 1, 1908.
920,616.
Patented May 4, 1909.
4 SHEETS—SHEET 1.
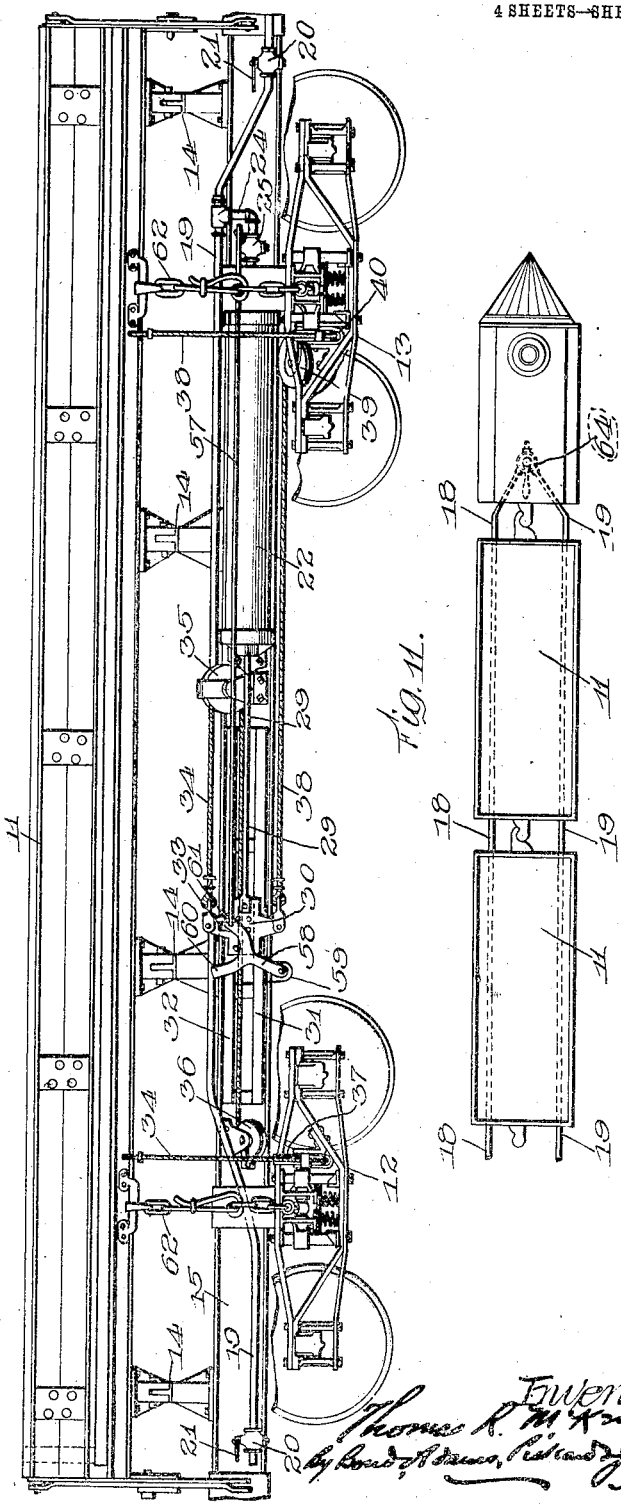

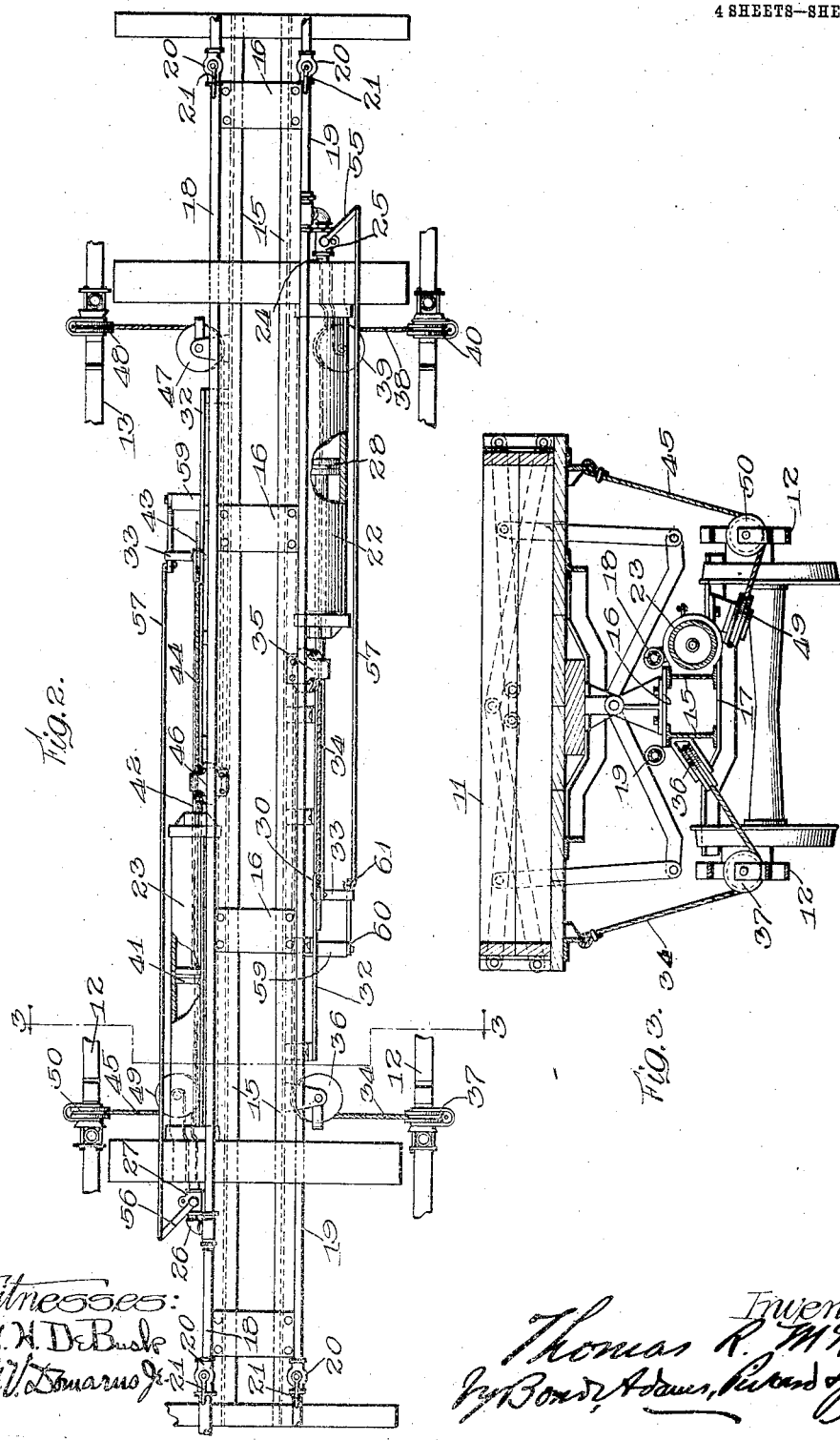

T. R. McKNIGHT.
DUMP CAR.
APPLICATION FILED FEB. 1, 1908.
920,616.
Patented May 4, 1909.
4 SHEETS—SHEET 3.
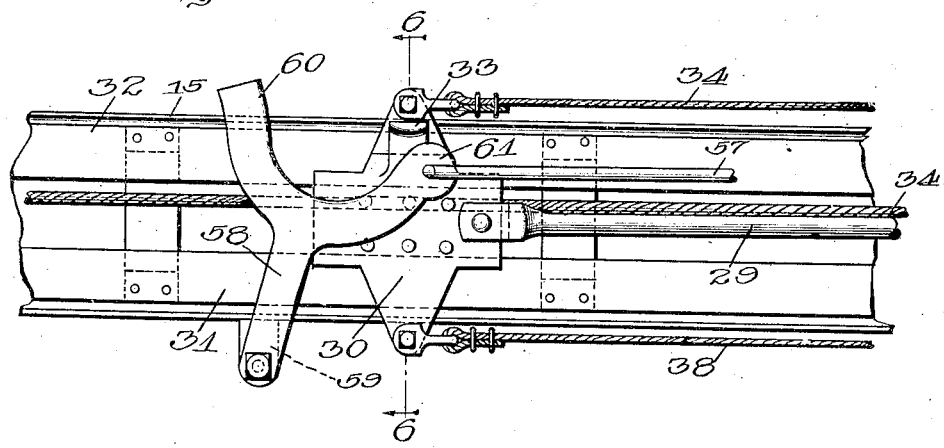
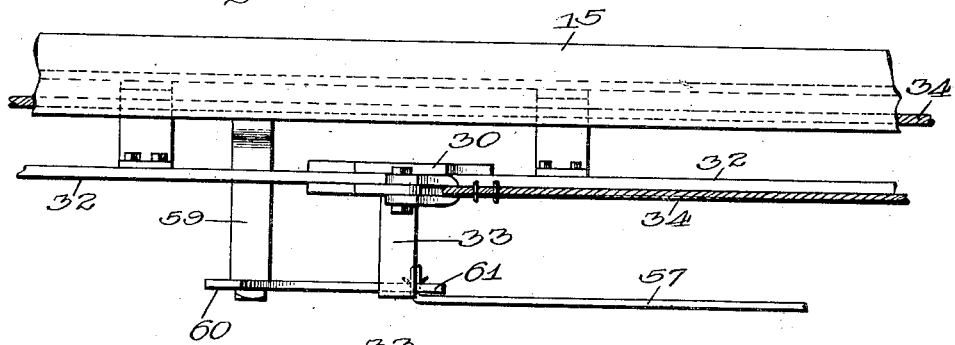
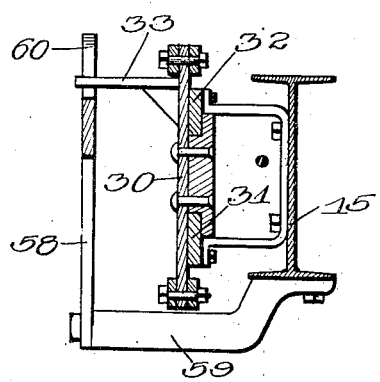
Witnesses:
W. H. DeBuck
G. V. Domarus Jr.
Inventor:
Thomas R. McKnight
By Bond, Adams, Pickard & Jackson
Attys

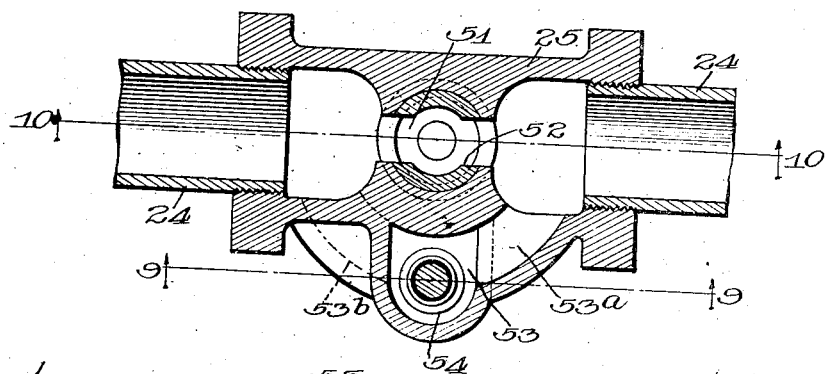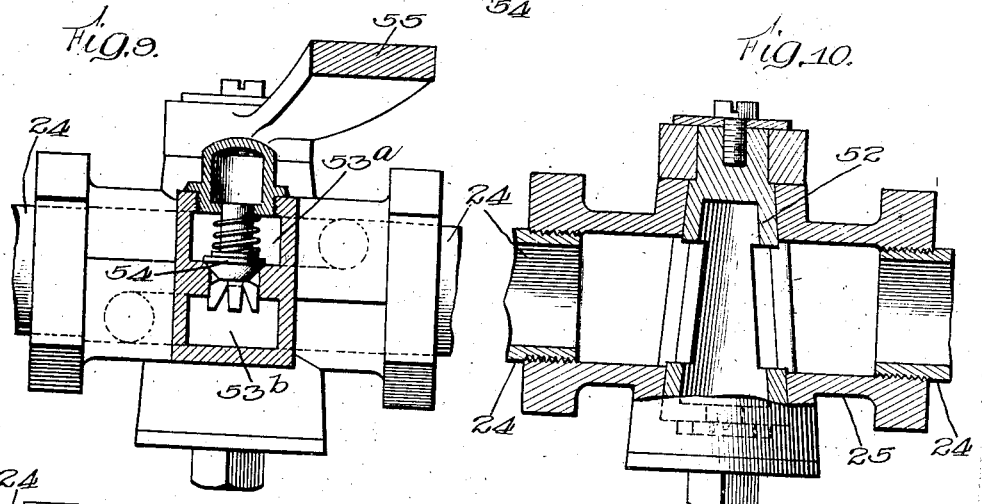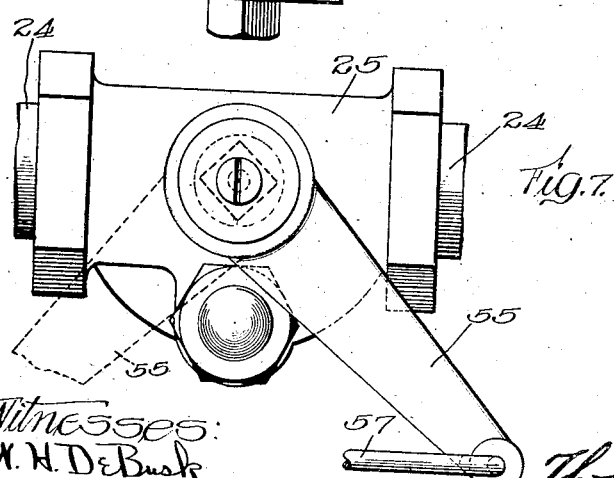

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

DUMP-CAR.

No. 920,616.　　　Specification of Letters Patent.　　Patented May 4, 1909.

Application filed February 1, 1908. Serial No. 413,861.

*To all whom it may concern:*

Be it known that I, THOMAS R. McKNIGHT, a citizen of the United States, residing at Aurora, in the county of Kane and State of Illinois, have invented certain new and useful Improvements in Dump-Cars, of which the following is a specification, reference being had to the accompanying drawings.

My invention relates to dump-cars, and has particularly to do with cars arranged to be dumped by means of compressed air.

The principal objects of my invention are to provide for dumping the cars by direct pull at the side at which the load is to be dumped so that the car-body may be properly tilted and held in its tilted position until the load may be scraped out; and also to provide for economizing the amount of compressed air employed in dumping the several cars of a train by employing only so much air for any given car as is necessary to dump that car. As is well known, the several cars of a train do not all require the same amount of power for dumping them. One car may have a light load, another car may have its load nearer to one side than the other, and still others might have heavy loads or loads distributed uniformly throughout the car, so that certain cars would dump more easily at one side than at the other of the train. In fact, the precise amount of power necessary to be exerted to dump the several cars is never the same for all of them. It will be seen, therefore, that where the cars are arranged to be dumped by air pressure supplied from the locomotive it is very desirable that only so much air pressure be applied to any given car as is necessary to dump its load, and this I accomplish by my invention.

In the accompanying drawings,—Figure 1 is a side elevation of a dump-car embodying my improvements; Fig. 2 is a plan view, the body of the car being removed and certain parts being in section; Fig. 3 is a cross-section on line 3—3 of Fig. 2; Fig. 4 is an enlarged detail in side elevation, showing a part of the mechanism for automatically controlling the compressed air supply; Fig. 5 is a plan view of the same; Fig. 6 is a section on line 6—6 of Fig. 4; Fig. 7 is a plan view of the air shut-off valve; Fig. 8 is a horizontal section thereof; Fig. 9 is a section on line 9—9 of Fig. 8; Fig. 10 is a section on line 10—10 of Fig. 8; and Fig. 11 is a side elevation indicating diagrammatically the arrangement of a train of cars equipped with my improved dumping mechanism.

Referring to the drawings,—11 indicates the car-body, which, in the construction shown, is provided with two trucks 12—13, but it may be of any other approved form. The car-body is mounted so as to tilt laterally at either side,—this being accomplished, in the construction shown, by mounting it upon pivotal supports 14 placed at intervals under the body of the car, as best shown in Fig. 1. It will be understood that the trucks 12—13 are connected by suitable framework—preferably parallel I-beams 15—connected by upper and lower cross-pieces 16—17, as shown in Figs. 2 and 3.

18—19 indicate compressed air train-pipes extending longitudinally of the car, preferably over the I-beams 15, as shown in Fig. 2,—said train-pipes being provided with the usual connections 20 for connecting them with the corresponding pipes of other cars. Said connections are provided with valves 21, by which they may be closed. The train-pipe 18 is for supplying compressed air to dump the load at one side of the car, and the pipe 19 for performing a similar office at the other side.

22—23 indicate cylinders placed at the opposite sides of the car and near opposite ends thereof, as shown in Fig. 2. Said cylinders are employed respectively for dumping the car at one side or the other.

24 indicates a pipe leading from the train-pipe 19 to the cylinder 22, said pipe being provided with a combination cut-off and check-valve 25, as best shown in Fig. 1. The construction of said valve will be hereinafter explained. In like manner the cylinder 23 is connected with the train-pipe 18 by a pipe 26 having a similar valve 27, as shown in Fig. 2. The connection of the train-pipes, respectively, with the cylinders 22—23 is made at the outer ends of said cylinders—that is to say, the ends nearest the ends of the car—so that compressed air is admitted to said cylinders at or near their outer ends.

28 indicates a piston-head in the cylinder 22 having a piston-rod 29 which extends through the inner head of the cylinder, moving longitudinally of the car. Said piston-rod is connected at its outer end with a cross-head or traveling guide 30 moving on ways 31—32, as best shown in Figs. 1 and 4,—said ways being suitably supported at the side of the car. By this construction the cross-head 30 is supported and guided as it moves longitudinally of the car under the action of the compressed air in the cylinder by which it is operated. The cross-head 30 is provided with a laterally-projecting arm 33, as best shown in Figs. 4, 5 and 6.

34 indicates a cable connected with the cross-head 30, as shown in Figs. 4 and 5, and extending around pulleys 35, 36 and 37, best shown in Figs. 1, 2 and 3,—its opposite ends being connected with the side of the car near one end thereof. 38 indicates another cable also connected with the cross-head 30 and extending around pulleys 39—40 and being connected at its end with the side of the car near the opposite end thereof, as shown in Fig. 1. By the arrangement of the cables and pulleys shown it will be seen that when the piston in the cylinder 22 moves in one direction—as to the left in Fig. 1—it will operate through the cables 34—38 to pull down on that side of the car-body to which the cables are connected, thereby dumping the car-body at that side. Movement of the piston in the opposite direction slackens the cables 34—38, permitting the car-body to return to its horizontal or normal position under the action of the cylinder at the opposite side of the car, as hereinafter described. It will be understood that the cylinder 23 is also provided with a piston 41 similar to the piston 28 and having a piston-rod 42 connected with a cross-head 43 which is provided with cables 44—45,—all of said parts being arranged and operating in the same way as the corresponding parts at the opposite side of the car.

46, 47, 48, indicate the set of pulleys over which the cable 44 operates, and 49—50 the pulleys over which the cable 45 operates. The normal position of the pistons 28—41 is midway of the length of their respective cylinders, so that either piston is free to move in either direction to enable the load to be dumped at either side of the car. The construction of the combination cut-off and check-valves 25 and 27 hereinbefore referred to is best shown in Figs. 7 to 10. As therein shown, said valve is provided with a straight way 51 controlled by an ordinary key 52 and with a by-pass 53 controlled by a spring-seated check-valve 54 best shown in Fig. 9. As shown in Figs. 8 and 9, the check-valve 54 is seated intermediately in the by-pass between the end portions thereof, which are on different levels, as indicated at 53ᵃ and 53ᵇ. The check-valve 54 is arranged to permit air to pass out of the cylinder with which it is connected, but prevents the admission of air to said cylinder through the by-pass.

55 indicates a lever connected with the key of the valve 25, and 56 a similar lever connected with the key of the valve 27. Said levers are for rotating their respective keys to open or close the direct passages through their respective valves.

57 indicates a rod connected at one end with the valve lever 55 and at the opposite end with a bifurcated rocking-lever 58 pivoted to a suitable support 59 preferably secured to the I-beam 15 and projecting under the path of the cross-head 30, as best shown in Fig. 6. The arrangement of the rocking-lever 58 is such that when it is in the position shown in Fig. 4 one of its arms 60 is in the path of the arm 33,—its other arm 61 being then inclined sufficiently to carry it below the path of said arm 33, as also shown in Fig. 4. This is the position of the lever 58 when the valve 25 is open for the admission of compressed air to the cylinder 22. By rocking the lever 58 to the left, as shown in Fig. 4, the lever 55 is swung to close the valve 25 against the admission of compressed air to said cylinder, and in that case the arm 60 swings down below the path of the arm 33, while the arm 61 swings upward into the path of said arm 33.

It will be seen from the foregoing description that when the parts are in the position shown in the drawings and compressed air is admitted to cylinder 22 through train-pipe 19, the cross-head 30 will move to the left, its arm 33 passing over the arm 61 of lever 58, and this movement of the cross-head 30 will operate through cables 34—38 to pull down on the adjacent side of the car-body and thereby dump the load. When the cross-head 30 approaches the limit of its movement, its arm 33 will strike arm 60 of lever 58, thereby swinging said lever to the left and operating lever 55 to close the main passage through valve 25, thereby preventing the further admission of compressed air to cylinder 22. When the lever 58 swings to the left, as described, its arm 61 is carried up into the path of arm 33 so that when the movement of the cross-head 30 is reversed the arm 33 will operate to return the lever 58 to its original position, thereby again opening the main passage through the valve 25. The escape of compressed air from cylinder 22 is permitted while the main passage through valve 25 remains closed, by the check-valve 54, which, as has been explained, permits the escape of air but prevents its admission. Of course, after the main passage through the valve is again opened in the manner described the air may escape through that passage also.

The arrangement of the parts at the opposite side of the machine is the same as that described, except that they operate oppositely. The train-pipes 18—19 of each car are connected with the corresponding pipes of the next car as indicated in Fig. 11 and finally with the engine, which is provided with a suitable valve 64 by which the engineer may admit air to or exhaust it from either train-pipe 18 or 19 at pleasure, or may equalize the air pressure in both train-pipes. Preferably I employ a valve having the construction shown and described in my pending application No. 397,152, filed October 12, 1907. After the load has been dumped at one side of the car, the car-body is restored to its normal position by admitting air to the cylinder at the opposite side,—the stay-chains 62 which are usually provided serving to keep the car-body from swinging to the opposite side when being righted. Before dumping it is, of course, necessary to release the stay-chains at the side opposite that at which the load is to be dumped.

By my improved construction I not only provide a direct pull at either side of the car for dumping purposes and avoid the use of levers, rock-shafts or other similar devices, but I also am able to economize very materially in the use of compressed air, since, obviously, as soon as sufficient air has been admitted to any cylinder to dump the car-body operated by it, the further admission of air to that cylinder is at once cut off regardless of the condition of any other car in the train. So far as I am aware, this has never before been accomplished and is claimed broadly. In other respects also my invention is not restricted to the specific devices illustrated and described, but includes generically the subject-matter of the broader claims.

That which I claim as my invention, and desire to secure by Letters Patent, is,—

1. A dump-car having a car-body arranged to dump at either side compressed-air-operated dumping-mechanism adapted to be actuated to tilt the car-body at either side, and means for automatically shutting off the supply of compressed air when the load is dumped.

2. The combination of a plurality of dump-cars each having a car-body arranged to dump at either side, compressed-air-operated dumping-mechanism adapted to be actuated to tilt the car-body at either side, a train-pipe for supplying compressed air to said dumping-mechanisms, and means for automatically cutting off the supply of compressed air from any dumping-mechanism when the car operated by it is dumped.

3. The combination of a plurality of dump-cars each having a car-body arranged to dump at either side, compressed-air-operated dumping-mechanism adapted to be actuated to tilt the car-body at either side, a train-pipe connecting said dumping-mechanisms, a valve for admitting compressed air to said train-pipe and releasing the pressure therein, and means for automatically cutting off the dumping-mechanism of any car from said train-pipe when such car is dumped.

4. The combination of a plurality of dump-cars, each of said cars having a car-body arranged to dump at either side, compressed-air-operated dumping-mechanisms for dumping the load at opposite sides thereof, train-pipes connected with said dumping-mechanisms, means for admitting compressed air to one or the other of said train-pipes, and means for cutting off the supply of compressed air from the dumping-mechanism of any car when said car is dumped.

5. A dump-car having a car-body arranged to dump at either side, compressed-air-operated dumping-mechanism adapted to be actuated to tilt the car-body at either side, a valve for admitting compressed air thereto, means for automatically closing said valve when the load is dumped, and means for automatically opening said valve when the car-body is righted.

6. A dump-car having compressed-air-operated dumping-mechanism, a valve for admitting compressed air thereto, means for automatically closing said valve when the load is dumped, means for automatically opening said valve when the car-body is righted, and a check-valve for releasing the pressure on said dumping-mechanism when the car-body is being righted.

7. A dump-car having compressed-air-operated dumping-mechanisms for dumping the load at opposite sides thereof, pipes for supplying compressed air to said dumping-mechanisms, respectively, cut-off valves for controlling the admission of compressed air to said dumping-mechanisms, and means operated by the dumping of the car-body at either side of the car for closing the appropriate valve to cut off the supply of compressed air from the dumping-mechanism by which such dumping was effected.

8. A dump-car having compressed-air-operated dumping-mechanisms for dumping the load at opposite sides thereof, pipes for supplying compressed air to said dumping-mechanisms, respectively, cut-off valves for controlling the admission of compressed air to said dumping-mechanisms, means operated by the dumping of the car-body at either side of the car for closing the appropriate valve to cut off the supply of compressed air from the dumping-mechanism by which such dumping was effected, and means operated by the righting of the car-body for opening such valve.

9. A dump-car having compressed-air-operated mechanisms at opposite sides thereof for dumping the load at either side of the car, train-pipes communicating with said dumping-mechanisms, respectively, combination cut-off and check-valves controlling the admission of compressed air to said dumping-mechanisms and its escape therefrom, and means for automatically closing the cut-off valve of any dumping-mechanism when it has been actuated to dump the load and for automatically opening said cut-off valve when the car-body is righted.

10. A dump-car having a cylinder and piston for dumping the load, one or more cables connected with said piston and with the side of the car, and pulleys for guiding said cable so that movement of the piston in one direction operates to pull down on one side of the car to dump the load.

11. A dump-car having a pair of cylinders and pistons for dumping the load at either side of the car, cables connected with said pistons, respectively, and with the opposite sides of the car, and guide pulleys for said cables whereby by appropriately moving said pistons said cables are operated to pull down on either side of the car to dump the load or to right the car-body.

12. A dump-car having a tilting car-body, a cylinder, and a piston movable longitudinally of the car for dumping the load, one or more cables connected with said piston and with the side of the car, and pulleys for guiding said cables so that movement of the piston in one direction operates to pull down on one side of the car to dump the load.

13. A dump-car having a laterally-tilting car-body, a pair of cylinders, and pistons movable longitudinally of the car for dumping the load at either side of the car, cables connected with said pistons respectively and with the opposite sides of the car, and guide pulleys for said cables whereby by appropriately moving said pistons said cables are operated to pull down on either side of the car to dump the load or to right the car-body.

14. A dump-car comprising a laterally-tilting car-body having central pivotal supports, a cylinder, and a piston movable longitudinally of the car for dumping the load, one or more cables connected with said piston and with the side of the car, and means for guiding said cable so that movement of the piston in one direction operates to pull down on one side of the car to dump the load.

15. A dump-car comprising a laterally-tilting car-body having central pivotal supports and arranged to tilt at either side of the car, a pair of cylinders, and pistons movable longitudinally of the car for dumping the load at either side, cables connected with said pistons respectively and with the opposite sides of the car, and means for guiding said cables whereby by appropriately moving said pistons said cables are operated to pull down on either side of the car to dump the load or to right the car-body.

THOMAS R. McKNIGHT.

Witnesses:
J. B. STUART,
E. H. BEREMAN.